(12) United States Patent
Chakra et al.

(10) Patent No.: US 10,684,761 B2
(45) Date of Patent: Jun. 16, 2020

(54) GRAPHICAL USER INTERFACE CREATION USING HIGHLY RATED GUI ELEMENTS

(71) Applicant: International Business Machines Corporation, Armonk, NY (US)

(72) Inventors: Al Chakra, Apex, NC (US); Jonathan Dunne, Dungarvan (IE); Liam S. Harpur, Dublin (IE); Asima Silva, Holden, MA (US)

(73) Assignee: International Business Machines Corporation, Armonk, NY (US)

( * ) Notice: Subject to any disclaimer, the term of this patent is extended or adjusted under 35 U.S.C. 154(b) by 60 days.

(21) Appl. No.: 15/782,938

(22) Filed: Oct. 13, 2017

(65) Prior Publication Data

US 2019/0114059 A1 Apr. 18, 2019

(51) Int. Cl.
*G06F 9/48* (2006.01)
*G06F 3/0484* (2013.01)
(Continued)

(52) U.S. Cl.
CPC ............ *G06F 3/04847* (2013.01); *G06F 8/36* (2013.01); *G06F 8/38* (2013.01); *G06F 9/451* (2018.02); *G06F 3/0482* (2013.01); *G06F 3/0486* (2013.01); *G06F 3/04817* (2013.01); *G06F 3/04883* (2013.01)

(58) Field of Classification Search
CPC ............ G06F 3/04847; G06F 3/04817; G06F 3/0486; G06F 3/0482; G06F 3/04883; G06F 8/36; G06F 8/38; G06F 9/451
See application file for complete search history.

(56) References Cited

U.S. PATENT DOCUMENTS 8,099,673 B2 1/2012 Parkinson
8,191,004 B2 5/2012 Chandrasekar et al.
(Continued)

OTHER PUBLICATIONS

Jon Puleston, "Question Science: Drag & Drop qestions: a user guide", Jun. 27, 2011 [online], [retrieved on Jan. 15, 2019]. Retrieved from the Internet: <URL:https://web.archive.org/web/20131220013541/http://question-science.blogspot.com:80/2011/06/drag-n-droping.html>, 6 pages. (Year: 2011).*
(Continued)

*Primary Examiner* — Jennifer N To
*Assistant Examiner* — K C Chen
(74) *Attorney, Agent, or Firm* — Steven M. Bouknight

(57) ABSTRACT

A computer-implemented method generates a graphical user interface (GUI). A graphical user interface (GUI) development server receives a candidate GUI element. The candidate GUI element is in use by one or more current GUIs, and the candidate GUI element performs a computer-based function. The GUI development server receives a rating of the candidate GUI element from users of the one or more current GUIs, and determines whether the rating of the candidate GUI element exceeds a predefined value. In response to determining that the rating of the candidate GUI element exceeds the predefined value, the GUI development server identifies the candidate GUI element as a preferred GUI element to perform the computer-based function in future GUIs, and utilizes that preferred GUI element to generate a new GUI that needs the computer-based function.

17 Claims, 5 Drawing Sheets

(51) Int. Cl.
    *G06F 8/36*     (2018.01)
    *G06F 8/38*     (2018.01)
    *G06F 9/451*     (2018.01)
    *G06F 3/0481*     (2013.01)
    *G06F 3/0486*     (2013.01)
    *G06F 3/0482*     (2013.01)
    *G06F 3/0488*     (2013.01)

(56) References Cited

U.S. PATENT DOCUMENTS

| | | | | |
|---|---|---|---|---|
| 2008/0134045 | A1* | 6/2008 | Fridman | G06F 8/60 |
| | | | | 715/735 |
| 2009/0150541 | A1* | 6/2009 | Georgis | G06F 9/451 |
| | | | | 709/224 |
| 2011/0060994 | A1* | 3/2011 | Maxwell | G06F 3/147 |
| | | | | 715/730 |
| 2014/0137010 | A1 | 5/2014 | Matas et al. | |
| 2016/0098172 | A1* | 4/2016 | Bacinschi | G06F 8/38 |
| | | | | 715/747 |
| 2017/0168782 | A1* | 6/2017 | Boyd | G11B 27/031 |

OTHER PUBLICATIONS

P. Mell et al., "The NIST Definition of Cloud Computing", National Institute of Standards and Technology, Information Technology Laboratory, Sep. 2011, pp. 1-7.

Matt Kapko, "Social Media Engagement is Dead—2015 is About Measurable Goals". CXO Media Inc., cio.com, Jan. 14, 2015. Web Nov. 3, 2016. <http://www.cio.com/article/2867987/social-media/social-media-engagement-is-dead-2015-is-about-measurable-goals.html>.

Anonymous, "React: A Javascript Library for Building User Interfaces". Facebook Inc., 2016. Web Jul. 11, 2016. <https://facebook.github.io/react/>.

* cited by examiner

GRAPHICAL USER INTERFACE CREATION USING HIGHLY RATED GUI ELEMENTS

BACKGROUND

The present invention relates to the field of computers, and particularly to computers that generate graphical user interfaces (GUIs). Still more particularly, the present invention relates to automatically generating a GUI using highly rated GUI elements from previous GUIs.

SUMMARY

In one or more embodiments of the present invention, a computer-implemented method generates a graphical user interface (GUI). A graphical user interface (GUI) development server receives a candidate GUI element. The candidate GUI element is in use by one or more current GUIs that are being utilized by one or more GUI utilizing devices, and the candidate GUI element performs a computer-based function. The GUI development server receives a rating of the candidate GUI element from one or more users of the one or more current GUIs, and determines whether the rating of the candidate GUI element exceeds a predefined value. In response to determining that the rating of the candidate GUI element exceeds the predefined value, the GUI development server identifies the candidate GUI element as a preferred GUI element to perform the computer-based function in future GUIs. The GUI development server receives a request from a client computer for a new GUI that performs the computer-based function of the candidate GUI element; generates a new GUI that includes the preferred GUI element; and transmits, to the client computer, the new GUI that includes the preferred GUI element.

The described invention may also be implemented in a computer system and/or as a computer program product.

DETAILED DESCRIPTION

Figure 1:
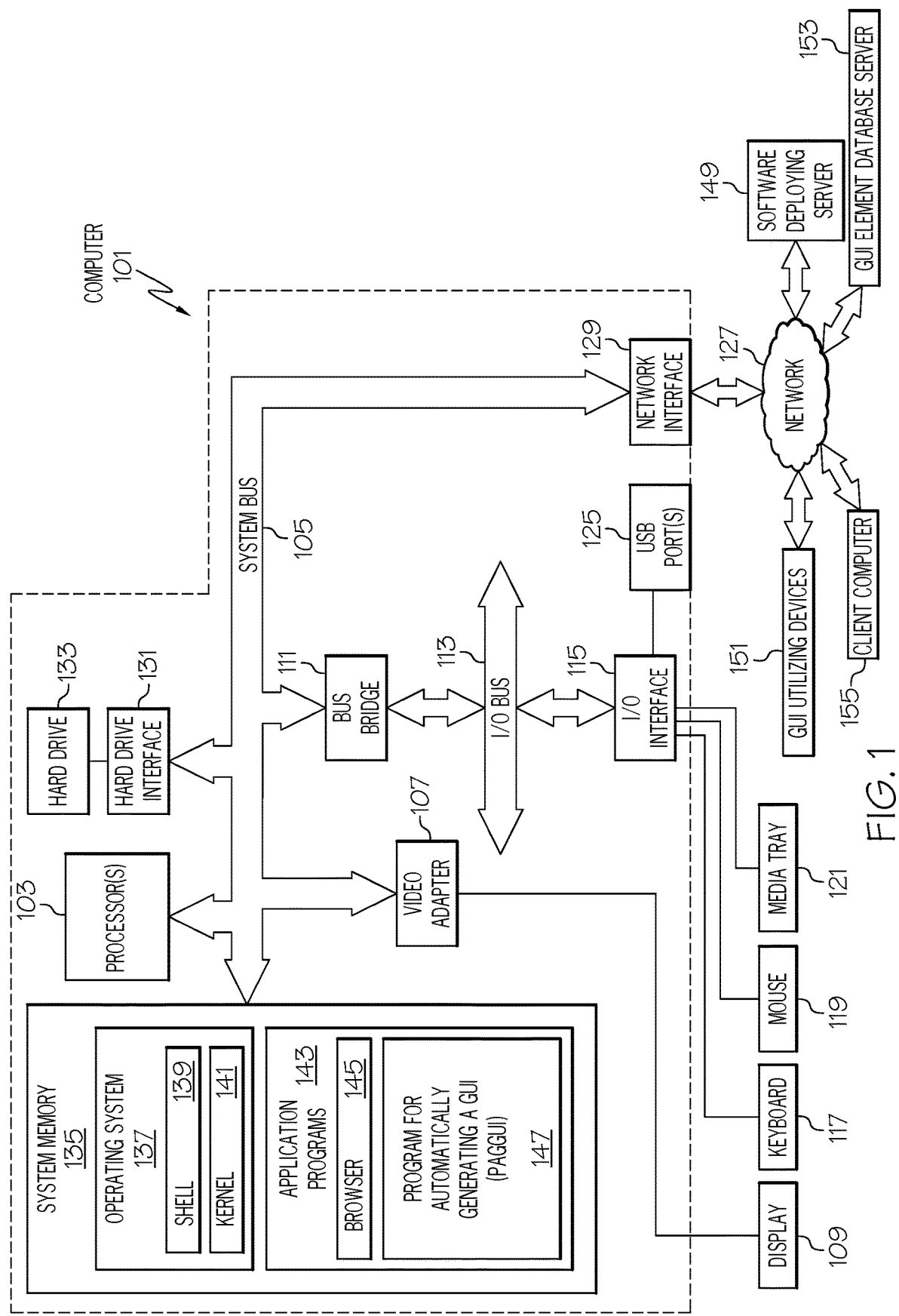
FIG. 1 depicts an exemplary system and network in which the present disclosure may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular to FIG. 1, there is depicted a block diagram of an exemplary system and network that may be utilized by and/or in the implementation of the present invention. Some or all of the exemplary architecture, including both depicted hardware and software, shown for and within computer 101 may be utilized by software deploying server 149 and/or a GUI utilizing devices 151 and/or GUI element database server 153 and/or client computer 155 shown in FIG. 1, as well as GUI utilizing devices 251a-251n and/or GUI development server 201 and/or client computer 255 shown in FIG. 2.

Exemplary computer 101 includes a processor 103 that is coupled to a system bus 105. Processor 103 may utilize one or more processors, each of which has one or more processor cores. A video adapter 107, which drives/supports a display 109 (which may be a touch-screen display capable of detecting touch inputs onto the display 109), is also coupled to system bus 105. System bus 105 is coupled via a bus bridge 111 to an input/output (I/O) bus 113. An I/O interface 115 is coupled to I/O bus 113. I/O interface 115 affords communication with various I/O devices, including a keyboard 117, a mouse 119, a media tray 121 (which may include storage devices such as CD-ROM drives, multimedia interfaces, etc.), and external USB port(s) 125. While the format of the ports connected to I/O interface 115 may be any known to those skilled in the art of computer architecture, in one embodiment some or all of these ports are universal serial bus (USB) ports.

As depicted, computer 101 is able to communicate with a software deploying server 149 and/or other devices/systems using a network interface 129. Network interface 129 is a hardware network interface, such as a network interface card (NIC), etc. Network 127 may be an external network such as the Internet, or an internal network such as an Ethernet or a virtual private network (VPN). In one or more embodiments, network 127 is a wireless network, such as a Wi-Fi network, a cellular network, etc.

A hard drive interface 131 is also coupled to system bus 105. Hard drive interface 131 interfaces with a hard drive 133. In one embodiment, hard drive 133 populates a system memory 135, which is also coupled to system bus 105. System memory is defined as a lowest level of volatile memory in computer 101. This volatile memory includes additional higher levels of volatile memory (not shown), including, but not limited to, cache memory, registers and buffers. Data that populates system memory 135 includes computer 101's operating system (OS) 137 and application programs 143.

OS 137 includes a shell 139, for providing transparent user access to resources such as application programs 143. Generally, shell 139 is a program that provides an interpreter and an interface between the user and the operating system. More specifically, shell 139 executes commands that are entered into a command line user interface or from a file. Thus, shell 139, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 141) for processing. While shell 139 is a text-based, line-oriented user interface, the present invention will equally well support other user interface modes, such as graphical, voice, gestural, etc.

As depicted, OS 137 also includes kernel 141, which includes lower levels of functionality for OS 137, including providing essential services required by other parts of OS 137 and application programs 143, including memory management, process and task management, disk management, and mouse and keyboard management.

Application programs 143 include a renderer, shown in exemplary manner as a browser 145. Browser 145 includes program modules and instructions enabling a world wide web (WWW) client (i.e., computer 101) to send and receive network messages to the Internet using hypertext transfer protocol (HTTP) messaging, thus enabling communication with software deploying server 149 and other systems.

Application programs 143 in computer 101's system memory (as well as software deploying server 149's system memory) also include a Program for Automatically Generating a Graphical User Interface (PAGGUI) 147. PAGGUI 147 includes code for implementing the processes described below, including those described in FIGS. 2-3. In one embodiment, computer 101 is able to download PAGGUI 147 from software deploying server 149, including in an on-demand basis, wherein the code in PAGGUI 147 is not downloaded until needed for execution. In one embodiment of the present invention, software deploying server 149 performs all of the functions associated with the present invention (including execution of PAGGUI 147), thus freeing computer 101 from having to use its own internal computing resources to execute PAGGUI 147.

GUI utilization devices 151 are computers, smart phones, and other computing devices that utilize a GUI, such as a GUI for an application.

GUI element database server 153 is a server that stores and serves GUI elements that are used by GUIs that are used by the GUI utilization devices 151.

Client computer 155 is a computer that is requesting computer 101 to generate a GUI for use by client computer 155 according to parameters expressed by client computer 155.

The hardware elements depicted in computer 101 are not intended to be exhaustive, but rather are representative to highlight essential components required by the present invention. For instance, computer 101 may include alternate memory storage devices such as magnetic cassettes, digital versatile disks (DVDs), Bernoulli cartridges, and the like. These and other variations are intended to be within the spirit and scope of the present invention.

Figure 2:
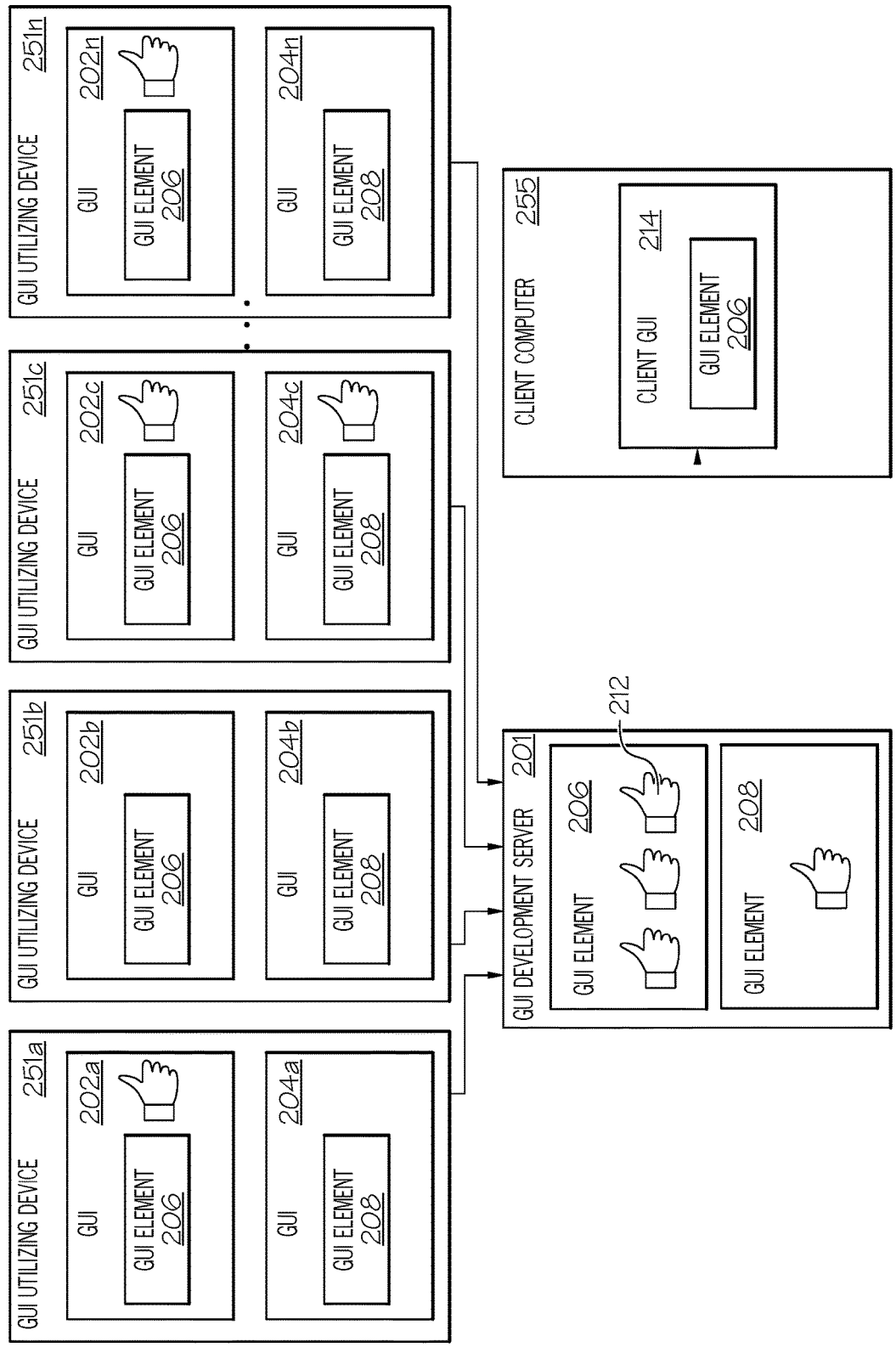
FIG. 2 illustrates an exemplary relationship among graphical user interface (GUI) utilizing devices, a GUI development server, and a client computer in accordance with one or more embodiments of the present invention.

With reference now to FIG. 2, an exemplary relationship among graphical user interface (GUI) utilizing devices 251a-251n (where "n" is an integer), a GUI development server 201, and a client computer 255 is presented in accordance with one or more embodiments of the present invention.

Assume that a user of client computer 255 (analogous to client computer 155 shown in FIG. 1) wants a GUI to be developed for client computer 255 by GUI development server 201 (analogous to computer 101 shown in FIG. 1). Assume further that client computer 255 wants this client GUI to have a certain functionality that is provided by a GUI element, such as an input field, a widget (i.e., an icon that, when clicked or otherwise activated, performs a certain function), a display of data, etc. The user of the client computer 255 thus relies on the GUI development server 201 to generate a GUI that not only is functional, but also will be well received by users who will be using that GUI.

As shown in FIG. 2, assume that GUI development server 201 has access to GUI utilizing devices 251a-251n (which are analogous to GUI utilizing devices 151 shown in FIG. 1). GUI utilizing devices 251a-251n are computing devices, such as desktop computers, laptop computers, tablet computers, smart phones, etc., each of which is running one or more applications that utilize GUIs 202a-202n and/or GUI 204a-204n, which may the same or different. That is, each of the GUIs 202a-202n may be a copy of a same GUI (e.g., all of the GUIs 202a-202n are a same interface for a particular program, such as a web browser); each of GUIs 202a-202n may be different variations of a GUI that perform a similar function (e.g., each of the GUIs 202a-202n have a different appearance, design, and even operational code, but they all provide the same function, such as providing access to a portal); or each of the GUIs 202a-202n may be for unrelated uses/applications (e.g., GUI 202a may be for a web browser, GUI 202b may be for a word processing program, etc.).

However, each of the GUIs 202a-202n utilize an exact same GUI element 206, which may be a widget (i.e., an icon that, when activated, performs some function such as retrieving data, checking spelling, opening or closing a window, etc.), an active data input field, etc.

As shown in FIG. 2, each of the GUI utilization devices 251a-251n have, in one embodiment, GUIs 204a-204n, each of which contains a GUI element 208. GUIs 204a-204n may perform a same function as GUIs 202a-202n, or they may perform functions that are different from GUIs 202a-202n. That is, GUIs 204a-204n may be GUIs for a same type of application that uses GUIs 202a-202n (i.e., GUI's 204a-204n and GUI's 202a-202n both support web browsers), or GUIs 204a-204n may be GUIs for different types of applications that use GUIs 202a-202n (e.g., GUI's 204a-204n may be used with a web browser program while and GUI's 202a-202n are used with a calendar application). In one embodiment, GUIs 202a-202n are the same GUIs as GUIs 204a-204n, while in another embodiment GUIs 202a-202n are different GUIs from GUIs 204a-204n.

Thus, GUI utilizing devices 251a-251b may be using the same or different types of GUIs 202a-202n, the same or different types of GUIs 204a-204n, various combinations thereof, etc. However, as shown in FIG. 2, any GUI utilizing device from GUI utilizing devices 251-251b that use GUI element 206 and/or GUI element 208 uses a same copy (i.e., has the same functionality, appearance, features, etc.) of GUI element 206 and/or GUI element 208.

For purposes of explanation of one or more embodiments of the present invention, assume that GUI utilizing devices 251a-251n are running application(s) that use a same copy of GUI element 206 and/or GUI element 208. Assume further that each of the GUI utilizing devices 251a-251n have the ability to allow a user to "like" or "dislike" the GUI element 206 and/or GUI element 208. That is, GUI utilizing device 251c has an ability (e.g., provided by a drop-down menu, etc.) to activate the "like" button 210 shown in GUI 202c for GUI element 206.

For example, assume that "like" button 210 is initially in a stand-by mode (e.g., is "greyed out"). However, by "dragging and dropping" GUI element 206 onto "like" button 210, then GUI utilizing device 251c will send a "like" signal 212 to GUI development server 201, indicating a vote that reflects the sentiment (approval) of the user of GUI 202c that this user likes the function, appearance, format, etc. of GUI element 206.

Users of the other GUIs 202a-202n that also have the GUI element 206 also send messages to the GUI development server 201 indicating whether they like (based on the presence of a message such as "like" signal 212) or do not like (based on the absence of a message such as "like" signal 212 or alternatively an express "dislike" signal, not shown) the GUI element 206.

Any user of the GUIs 204a-204n (if they are actually used by some or all of the GUI utilizing devices 251a-251n) may have similar like/dislike messages about GUI element 208.

Assume now that GUI element 206 and GUI element 208 perform a same function, but they have different appearances (i.e., different colors, fonts, etc.) and/or have a different way to interface with the user (e.g., GUI element 206 is activated by a touch screen while GUI element 208 is only activated by hovering a cursor over it and double clicking). Assume that users of GUIs 202a-202n and/or GUIs 204a-204n have "voted" (by activating their copy of the "like" button 210) as to whether or not they like GUI element 206 and/or GUI element 208.

For example, and as shown in FIG. 2, the user of GUI utilization device 251a likes GUI element 206 but not GUI element 208; the user of GUI utilization device 251b does not like either GUI element 206 or GUI element 208; and the user of GUI utilization device 251a likes both GUI element 206 as well as GUI element 208. These sentiments about GUI element 206 and/or GUI element 208 are sent from the users of GUI utilizing devices 251a-251n to the GUI development server 201. As shown in FIG. 2, GUI element 206 has three "like" votes, while GUI element 208 has only one "like" vote from the users of GUI utilizing devices 251a-251n.

In one embodiment, assume that GUI element 206 and GUI element 208 perform the same function, but have a different look and feel (i.e., the user experience is different). As such, GUI element 206 is deemed more popular with users than GUI element 208.

In another embodiment, assume that GUI element 206 and GUI element 208 perform different functions, or else GUI utilization devices 251a-251n only use GUI element 206. As such, GUI development server 201 will decide if just three "likes" is enough (i.e., is popular enough with users) to justify using GUI element 206 in future GUIs.

In either embodiment, if GUI development server 201 determines that GUI element 206 (or GUI element 208 if performing a function other than that of GUI element 206) is popular enough with users (based on receiving more liked votes than other similar-function GUIs or else having a raw number of percentage of positive "like" reviews from users), then GUI development server 201 will use GUI element 206 when constructing future GUIs. If both GUI element 206 and GUI element 208 receive the same number of "like" votes, the user may then be provided the option to select their preferred GUI element.

For example, assume that client computer 255 has sent a message to GUI development server 201 requesting that GUI development server generate a client GUI 214 that is able to perform a function that GUI element 206 provides. That is, assume that GUI element 206 closes a window, and the user of client computer 255 wants a client GUI 214 that allows the user to close a window. Assume further that GUI element 206 has enough "like" votes from users of other GUIs 202a-202n to determine that GUI element 206 would be a useful addition to client GUI 214. As such, GUI development server 201 will then construct and send to client computer the client GUI 214 that has the GUI element 206 embedded therein.

The user of client computer 255 is thus assured that the client GUI 214, which may be used on client computer 255 or may be used on another platform such as a cell phone, etc., will be liked.

Figure 3:
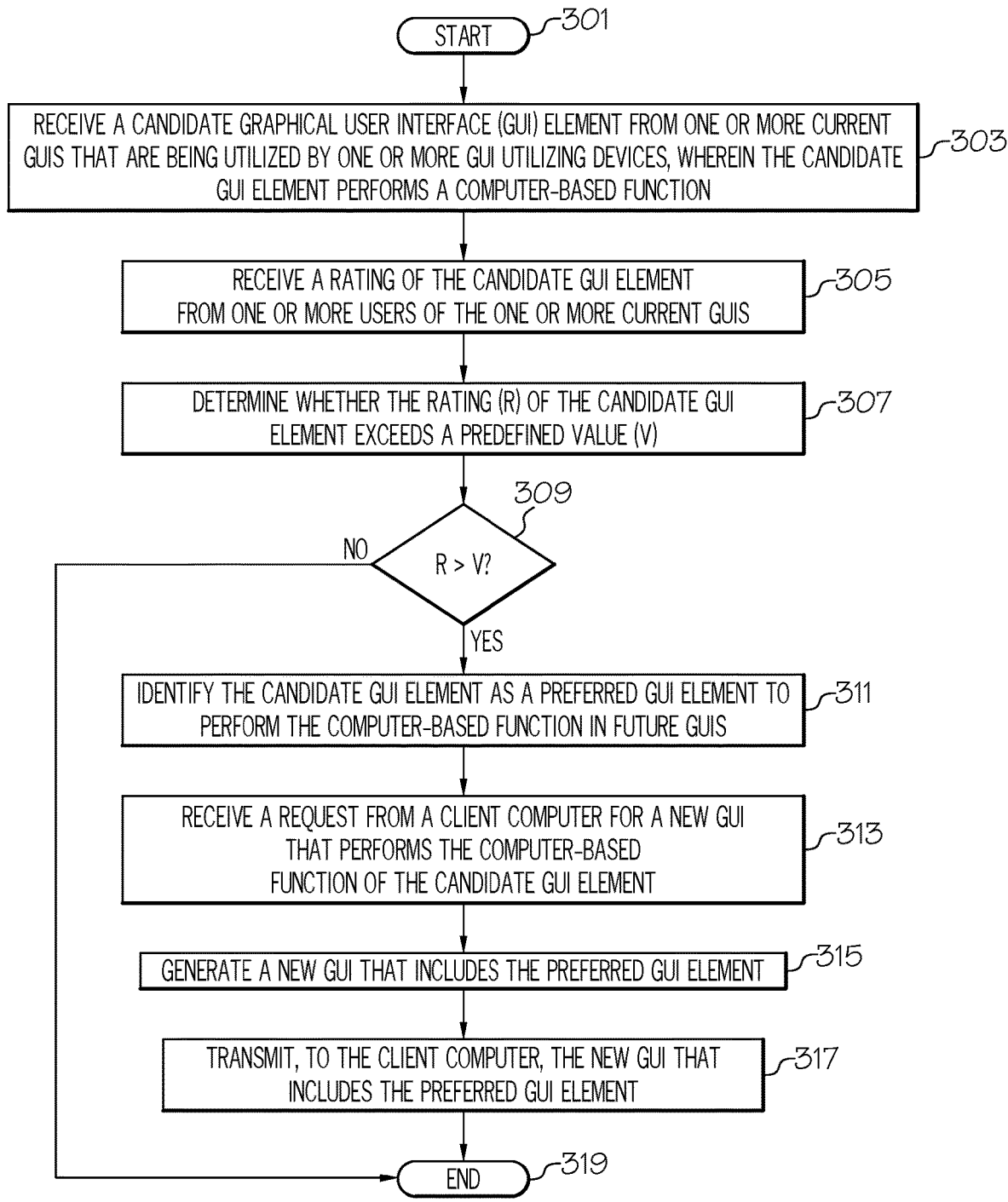
FIG. 3 is a high-level flow chart of one or more steps performed by one or more processors and/or other hardware devices to computer-generate a GUI in accordance with one or more embodiments of the present invention.

With reference now to FIG. 3, a high-level flow chart of one or more steps performed by one or more processors and/or other hardware devices to computer-generate a GUI in accordance with one or more embodiments of the present invention;

After initiator block 301, a graphical user interface (GUI) development server (e.g., GUI development server 201 shown in FIG. 2) receives a candidate GUI element (e.g., GUI element 206), as described in block 303. This candidate GUI element is in use by one or more current GUIs (e.g., GUIs 202a-202n shown in FIG. 2) that are being utilized by one or more GUI utilizing devices (e.g., GUI utilizing devices 251a-251n shown in FIG. 2). As described herein, the candidate GUI element (e.g., a widget) performs a computer-based function, such as closing a window, checking for spelling errors, etc.

As described in block 305, the GUI development server receives a rating of the candidate GUI element from one or more users of the one or more current GUIs (e.g., instances of the "like" signal 212 that were generated by the user(s) activating instances of the "like" button 210 on their computers).

As described in block 307, the GUI development server determines whether the rating of the candidate GUI element exceeds a predefined value (e.g., there have been more than five "likes" for GUI element 206, more than 80% of users of GUI element 206 like it, etc.).

As described in query block 309, a query is made as to whether the rating of the candidate GUI element exceeds the predefined value. If so (block 311), then the GUI development server identifies the candidate GUI element as a preferred GUI element to perform the computer-based function in future GUIs.

As described in block 313, the GUI development server receives a request from a client computer (e.g., client computer 255 shown in FIG. 2) for a new GUI (e.g., client GUI 214) that performs the computer-based function of the candidate GUI element. That is, the user of client computer 255 wants a GUI that includes the functionality that is provided by GUI element 206. However, GUI development server 201 will use GUI element 206 only if it has been deemed popular enough by users of other GUIs (GUIs. 202a-202n). Otherwise, GUI development server 201 will either find another GUI element that performs the function of GUI element 206 or else GUI development server 201 will generate a new GUI element that performs the function of GUI element 206.

As described in block 315, if GUI element 206 has proven to be popular enough (to be deemed the preferred GUI element for providing the functionality that GUI element 206 provides), then the GUI development server will generate a new GUI (e.g., client GUI 214) that includes the preferred GUI element (and thus provides the functionality that GUI element 206 provides).

As described in block 317, the GUI development server then transmits, to the client computer, the new GUI that includes the preferred GUI element.

The flow chart ends at terminator block 319.

In an embodiment of the present invention, the method further includes receiving, by the GUI development server, a rating of an unpopular GUI element on an active GUI, where the unpopular GUI element is a GUI element other than the preferred GUI element, and where the unpopular GUI element is designed to perform the computer-based function. The GUI development server determines that the rating of the unpopular GUI element is lower than the rating of the candidate GUI element. In response to determining that the rating of the unpopular GUI element is lower than the rating of the candidate GUI element, the GUI development server replaces the unpopular GUI element in the active GUI with the preferred GUI element. For example, assume that client GUI 214 has been populated with GUI element 208 instead of GUI element 206 (as shown in FIG. 2). Assume further that GUI element 206 and GUI element 208 perform the same function, but just have a different appearance, interface, etc., and thus a provide different user experiences. However, as shown in FIG. 2, GUI element 208 has not been well received by (i.e., is not popular with) previous users. As such, GUI development server 201 will replace unpopular GUI element 208 in client GUI 214 with the more popular GUI element 206, such that GUI 214 now has the more popular GUI element 206.

In an embodiment of the present invention, the method further includes determining, by the GUI development server, that the rating of the preferred GUI element has dropped below the predefined value; in response to determining that the rating of the preferred GUI element has dropped below the predefined value, locating and defining, by the GUI development server, GUIs that are currently using the preferred GUI element as obsolete GUIs; and removing, by the GUI development server, the preferred GUI element from the obsolete GUIs. For example, assume that GUI element 206 and GUI element 208 perform the same function, and that GUIs 202a-202n are using unpopular GUI element 208 and not the popular GUI element 206. When GUI development server 201 realizes this situation, it will replace the unpopular GUI element 208 with the popular GUI element 206 in the GUIs 202a-202n.

In an embodiment of the present invention, the one or more current GUIs run on a first software platform and the new GUI runs on a different second software platform. For example, assume that GUI utilizing devices 251a-251n are desktop computers running on a first type of operating system while client computer 255 is a smart phone that is running on a second type of operating system. Alternatively, assume that GUIs 202a-202n are for a word processing program while client GUI 214 is for a browser. In either scenario, the GUI element 206 needs to be modified in order to run on the client GUI 214. As such, the computer-implemented method further includes modifying, by the GUI development server, the preferred GUI element to run on the second software platform before populating the new GUI with the preferred GUI element. This modification can be performed by modifying the code that produces the GUI element 206, such that the GUI element 206 will function properly in the new environment that client computer 255 provides.

In an embodiment of the present invention, the multiple users of the one or more current GUIs generate ratings of the candidate GUI element by selectively dragging the candidate GUI element to either a "like" icon or a "dislike" icon on the one or more current GUIs in order to generate the rating of the candidate GUI element. Alternatively, the users simply click the "like" icon, such that clicking the "like" icon generates a "like" vote, and not clicking the "like" icon generates a default "dislike" vote.

In an embodiment of the present invention, ratings of the candidate GUI element by users of the one or more current GUIs are independent of overall ratings of the one or more current GUIs. That is, the users of GUIs 202a-202n are not voting on whether or not they like or do not like GUIs 202a-202n, but rather are just voting on whether or not they like GUI element 206. Thus, if a user of GUI 202 likes the GUI element 206 but does not like the rest of the GUI 202a, then that user has only a "partial like" of GUI 202a.

Thus, as described herein, the present invention provides a greater level of granularity for "liking" a GUI by allowing users to not simply like an overall GUI, but rather to "like" a particular element (e.g., a widget that performs a certain function or type of function), such that this same element/widget is used in future GUIs. As such, one or more embodiments of the present invention present a system and method that 1) allows specific sentiment data on an application's UI element to be captured (at the client level, or preferably at the server level), leading to 2) captured sentiment data that includes the sentiment feedback on a specific Application/UI element. In one or more embodiments, this captured sentiment data is stored for access by a centralized server. Thus, a sentiment analysis is performed on application elements sentiment data to motivate development functionality and features on future GUIs.

As described herein, a system is able to like/recommend content at a more granular level in order to ascertain a preferred GUI element. For example, UserA might only like a button or color in a GUI in Application1. Without the present invention, UserA would only be able to "like" the entire GUI (and its use in Application2). However, the present invention allows UserA to express his/her preference for a specific GUI element/widget used in the GUI in Application 1, rather than the entire GUI used in Application1. This preference of UserA for a specific GUI element/widget (rather than the entire GUI) is referred to as a "partial like" by the user.

Thus, in order to ascertain the part of the GUI that the user is likely to have "liked", the user first specifies the "liked" section/element/widget. Once selected, a plugin can be used to apply a partial like. For example, a user may 1) highlight the element/widget, and then 2) "drag" the highlighted element/widget to a "like" icon. Alternatively, the user may right click over the element/widget, resulting in a drop-down menu that allows the user to select "partial like" or some similar command that indicates that the user likes this element/widget without giving any opinion on the overall GUI. This "partial like" can then be communicated to other users or specified users.

In one embodiment of the present invention, the system maintains the partial likes (e.g., tags) in a transparent manner until a threshold of "proximity" partial likes are asserted. For example, the system would enable a GUI notification to denote a partial like of content only if five or more people "partial like" a particular GUI element/widget.

In an embodiment of the present invention, the user can override the default recommendation generated by the present invention. That is, if the system automatically populates a new GUI with the "popular" GUI element/widget, the user can override this action.

In an embodiment of the present invention, storage of "partial like" data is according to the following preferred embodiment. First, the application provider (e.g., an application owner) allows "tagging of content". In this implementation, a "wiki style" overlay is available for the user to apply a "like". The user can then specify that all users or users in a social network can see these "partial likes", thus enabling the platform provider to allow certain content to have the "like" added, but without changing the existing GUI. That is, the "like" and "dislike" voting on elements/widgets in the examined GUI do not affect the construction of this examined GUI itself.

In another embodiment, a centralized server maintains the "partial likes". Thus, when userA "likes" a button on Application 2, then it will be uploaded to the centralized server. As such, when userA, userB and userC view content, a client side plugin takes a "mask" of this information and applies it dynamically to the content being viewed.

In one or more embodiments, the GUI element is initially running on a first platform, but is needed to be used on a second (different) platform. One enabling embodiment for making this transition is to user a translation table, which is maintained such that one understands the overlapping functionality between applications. For example, this translation can be achieved through a taxonomy analysis on GUI text and images. Next, a comparative analysis uses score that are compared between the applications and the functions to motivate changes in development requirements. For example, if there is a positive like for GUI element X in Application1, and Application2 wants to also use GUI element X, then the translation table shows the equivalent function X that is provided by GUI element X in Application2, but which is missing in Application2. Thus, GUI c element X becomes a candidate for changing Application2

(and more specifically the GUI being used by Application2), after GUI element X is converted into a platform (e.g., rewritten to support the requirements of Application2, the operating system used by Application2, etc.) that is used by Application2.

The present invention may be implemented in one or more embodiments using cloud computing. Nonetheless, it is understood in advance that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
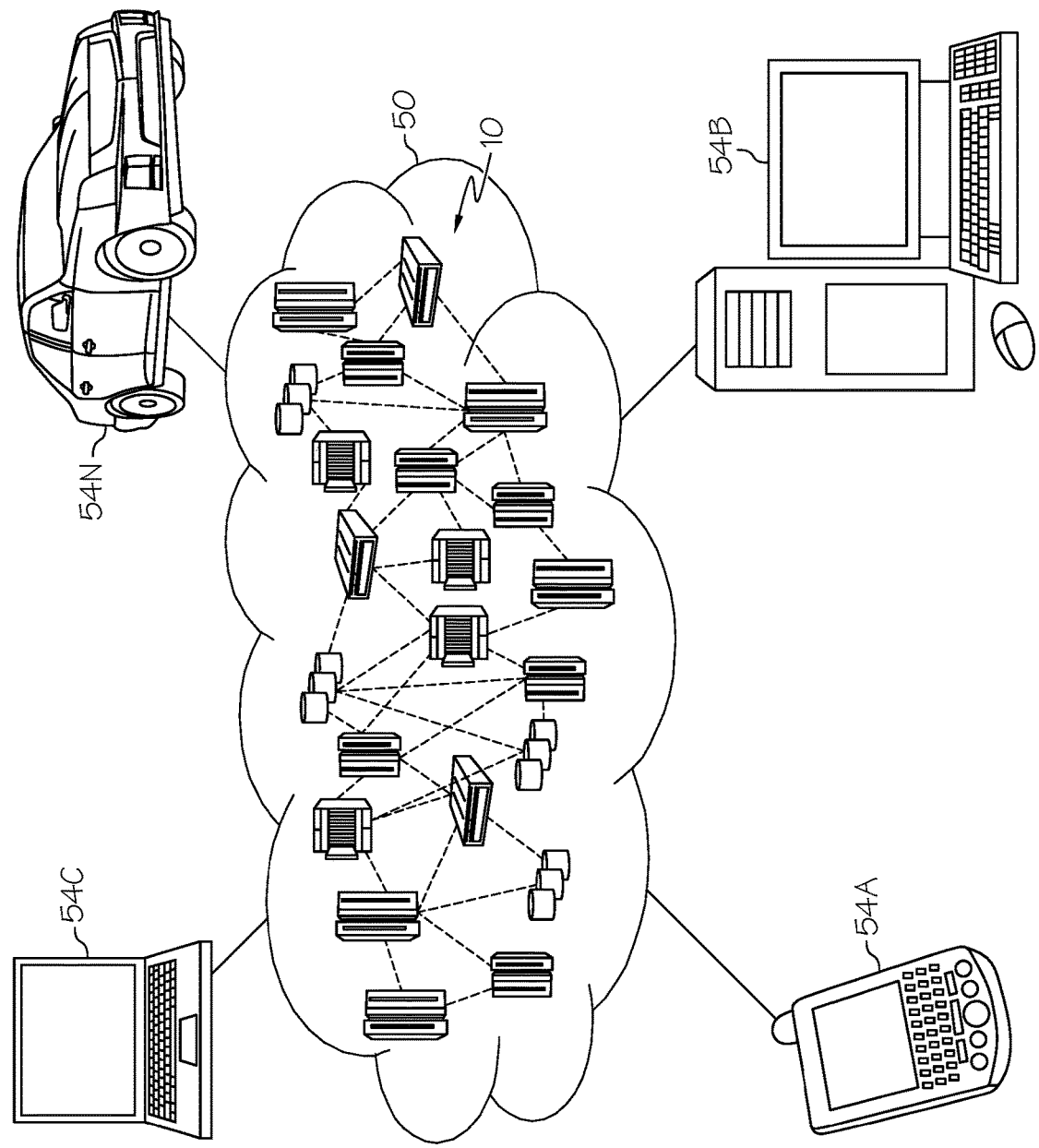
FIG. 4 depicts a cloud computing environment according to an embodiment of the present invention.

Referring now to FIG. 4, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-54N shown in FIG. 4 are intended to be illustrative only and that computing nodes 10 and cloud computing environment 50 can communicate with any type of computerized device over any type of network and/or network addressable connection (e.g., using a web browser).

Figure 5:
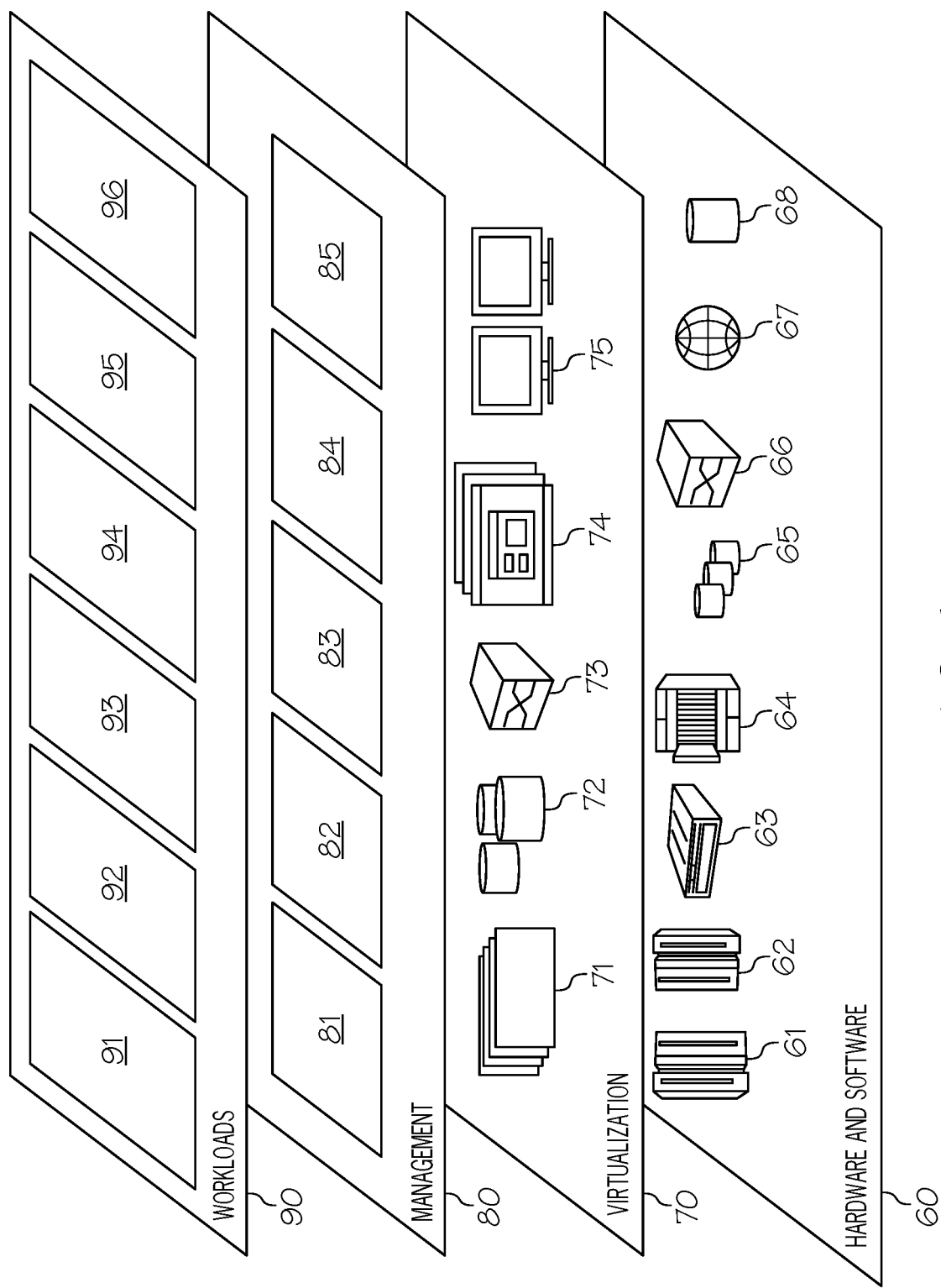
FIG. 5 depicts abstraction model layers of a cloud computer environment according to an embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and GUI generation processing 96, which performs one or more of the features of the present invention described herein.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A computer-implemented method for computer-generating a graphical user interface (GUI), the computer-implemented method comprising:

receiving, by a graphical user interface (GUI) development server, a candidate GUI element, wherein the candidate GUI element is one of a plurality of GUI elements of an active GUI on a first device, and wherein the active GUI on the first device further comprises a GUI element for a user to select a rating of the candidate GUI element;

receiving, by the GUI development server, a rating of the candidate GUI element from one or more users of the one or more current GUIs;

determining, by the GUI development server, whether the rating of the candidate GUI element exceeds a predefined value;

in response to determining that the rating of the candidate GUI element exceeds the predefined value, identifying, by the GUI development server, the candidate GUI element as a preferred GUI element to perform the computer-based function in future GUIs;

receiving, by the GUI development server, a rating of an unpopular GUI element on a second active GUI, wherein the unpopular GUI element is a GUI element other than the preferred GUI element, and wherein the unpopular GUI element is designed to perform the computer-based function;

determining, by the GUI development server, that the rating of the unpopular GUI element is lower than the rating of the candidate GUI element;

in response to determining that the rating of the unpopular GUI element is lower than the rating of the candidate GUI element, replacing, by the GUI development server, the unpopular GUI element in the second active GUI with the preferred GUI element; and determining, by the GUI development server, that the rating of the preferred GUI element has dropped below the predefined value;

in response to determining that the rating of the preferred GUI element has dropped below the predefined value, locating and defining, by the GUI development server, GUIs that are currently using the preferred GUI element as obsolete GUIs; and removing, by the GUI development server, the preferred GUI element from the obsolete GUIs.

2. The computer-implemented method of claim 1, further comprising:

receiving, by the GUI development server, a request from a client computer for a new GUI that performs the computer-based function of the candidate GUI element;

generating, by the GUI development server, a new GUI that includes the preferred GUI element; and transmitting, from the GUI development server to the client computer, the new GUI that includes the preferred GUI element.

3. The computer-implemented method of claim 1, wherein the one or more current GUIs run on a first software platform and the new GUI runs on a different second software platform, and wherein the computer-implemented method further comprises:

modifying, by the GUI development server, the preferred GUI element to run on the second software platform before populating the new GUI with the preferred GUI element.

4. The computer-implemented method of claim 1, wherein the GUI element for a user to select a rating of the candidate GUI element comprises a GUI allowing a user to selectively drag the candidate GUI element to either a "like" icon or a "dislike" icon in order to generate the rating of the candidate GUI element.

5. The computer-implemented method of claim 1, wherein ratings of the candidate GUI element by users of the one or more current GUIs are independent of overall ratings of the one or more current GUIs.

6. A computer program product for computer-generating a graphical user interface (GUI), the computer program product comprising a non-transitory computer readable storage device having program instructions embodied therewith, the program instructions readable and executable by a computer to perform a method comprising:

receiving a candidate GUI element, wherein the candidate GUI element is one of a plurality of GUI elements of an active GUI on a first device, and wherein the active GUI on the first device further comprises a GUI element for a user to select a rating of the candidate GUI element;

receiving a rating of the candidate GUI element from one or more users of the one or more current GUIs;

determining whether the rating of the candidate GUI element exceeds a predefined value;

in response to determining that the rating of the candidate GUI element exceeds the predefined value, identifying the candidate GUI element as a preferred GUI element to perform the computer-based function in future GUIs;

receiving a rating of an unpopular GUI element on a second active GUI, wherein the unpopular GUI element is a GUI element other than the preferred GUI element, and wherein the unpopular GUI element is designed to perform the computer-based function;

determining that the rating of the unpopular GUI element is lower than the rating of the candidate GUI element;

in response to determining that the rating of the unpopular GUI element is lower than the rating of the candidate GUI element, replacing the unpopular GUI element in the second active GUI with the preferred GUI element; and determining that the rating of the preferred GUI element has dropped below the predefined value;

in response to determining that the rating of the preferred GUI element has dropped below the predefined value, locating and defining GUIs that are currently using the preferred GUI element as obsolete GUIs; and removing the preferred GUI element from the obsolete GUIs.

7. The computer program product of claim 6, wherein the method further comprises:

receiving a request from a client computer for a new GUI that performs the computer-based function of the candidate GUI element;

generating a new GUI that includes the preferred GUI element; and transmitting, to the client computer, the new GUI that includes the preferred GUI element.

8. The computer program product of claim 6, wherein the one or more current GUIs run on a first software platform and the new GUI runs on a different second software platform, and wherein the method further comprises:

modifying the preferred GUI element to run on the second software platform before populating the new GUI with the preferred GUI element.

9. The computer program product of claim 6, wherein the GUI element for a user to select a rating of the candidate GUI element comprises a GUI allowing a user to selectively drag the candidate GUI element to either a "like" icon or a "dislike" icon in order to generate the rating of the candidate GUI element.

10. The computer program product of claim 6, wherein ratings of the candidate GUI element by users of the one or more current GUIs are independent of overall ratings of the one or more current GUIs.

11. The computer program product of claim 6, wherein the program instructions are provided as a service in a cloud environment.

12. A computer system comprising one or more processors, one or more computer readable memories, and one or more computer readable storage mediums, and program instructions stored on at least one of the one or more storage mediums for execution by at least one of the one or more processors via at least one of the one or more memories, the stored program instructions comprising:

program instructions to receive a candidate graphical user interface (GUI) element, wherein the candidate GUI element is one of a plurality of GUI elements of an active GUI on a first device, and wherein the active GUI on the first device further comprises a GUI element for a user to select a rating of the candidate GUI element;

program instructions to receive a rating of the candidate GUI element from one or more users of the one or more current GUIs;

program instructions to determine whether the rating of the candidate GUI element exceeds a predefined value;

program instructions to, in response to determining that the rating of the candidate GUI element exceeds the predefined value, identify the candidate GUI element as a preferred GUI element to perform the computer-based function in future GUIs;

program instructions to receive a rating of an unpopular GUI element on a second active GUI, wherein the unpopular GUI element is a GUI element other than the preferred GUI element, and wherein the unpopular GUI element is designed to perform the computer-based function;

program instructions to determine that the rating of the unpopular GUI element is lower than the rating of the candidate GUI element;

program instructions to, in response to determining that the rating of the unpopular GUI element is lower than the rating of the candidate GUI element, replacing the unpopular GUI element in the second active GUI with the preferred GUI element; and program instructions to determine that the rating of the preferred GUI element has dropped below the predefined value;

program instructions to, in response to determining that the rating of the preferred GUI element has dropped below the predefined value, locate and define GUIs that are currently using the preferred GUI element as obsolete GUIs; and program instructions to remove the preferred GUI element from the obsolete GUIs.

13. The computer system of claim 12, further comprising:

program instructions to receive a request from a client computer for a new GUI that performs the computer-based function of the candidate GUI element;

program instructions to generate a new GUI that includes the preferred GUI element; and program instructions to transmit, to the client computer, the new GUI that includes the preferred GUI element.

14. The computer system of claim 12, wherein the one or more current GUIs run on a first software platform and the new GUI runs on a different second software platform, and wherein the computer system further comprises:

program instructions to modify the preferred GUI element to run on the second software platform before populating the new GUI with the preferred GUI element.

15. The computer system of claim 12, wherein the GUI element for a user to select a rating of the candidate GUI element comprises a GUI allowing a user to selectively drag the candidate GUI element to either a "like" icon or a "dislike" icon in order to generate the rating of the candidate GUI element.

16. The computer system of claim 12, wherein ratings of the candidate GUI element by users of the one or more current GUIs are independent of overall ratings of the one or more current GUIs.

17. The computer system of claim 12, wherein the program instructions are provided as a service in a cloud environment.

* * * * *